(12) United States Patent
Teicholz et al.

(10) Patent No.: US 9,878,799 B2
(45) Date of Patent: Jan. 30, 2018

(54) TECHNIQUE FOR OPTIMIZING ENGINE PERFORMANCE USING FUEL TEMPERATURE

(71) Applicant: United Technologies Corporation, Farmington, CT (US)

(72) Inventors: Matthew D. Teicholz, Mystic, CT (US); Ethan K. Stearns, Lebanon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/112,648

(22) PCT Filed: Oct. 3, 2014

(86) PCT No.: PCT/US2014/059031
§ 371 (c)(1),
(2) Date: Jul. 19, 2016

(87) PCT Pub. No.: WO2015/116260
PCT Pub. Date: Aug. 6, 2015

(65) Prior Publication Data
US 2016/0332743 A1 Nov. 17, 2016

Related U.S. Application Data

(60) Provisional application No. 61/933,939, filed on Jan. 31, 2014.

(51) Int. Cl.
*B64D 37/34* (2006.01)
*F02C 7/22* (2006.01)
(Continued)

(52) U.S. Cl.
CPC ............ *B64D 37/34* (2013.01); *B64D 27/10* (2013.01); *F02C 7/06* (2013.01); *F02C 7/14* (2013.01);
(Continued)

(58) Field of Classification Search
CPC . B64D 37/34; B64D 27/10; F02C 9/28; F02C 7/22; F02C 7/14; F02C 7/06;
(Continued)

(56) References Cited

U.S. PATENT DOCUMENTS

| | | |
|---|---|---|
| 4,041,697 A | 8/1977 | Coffinberry et al. |
| 2005/0155353 A1 | 7/2005 | Sabatino et al. |

(Continued)

OTHER PUBLICATIONS

International Search Report and Written Opinion for related International Application No. PCT/US2014/059031 dated Jan. 27, 2015.

*Primary Examiner* — Brian P Sweeney
(74) *Attorney, Agent, or Firm* — Cantor Colburn LLP

(57) ABSTRACT

A method of protecting fuel hardware for a gas turbine engine in an aircraft is disclosed. The method may include determining a current altitude of the aircraft, and controlling a temperature of fuel for the gas turbine engine based at least in part on the current altitude. A thermal management system for a gas turbine engine in an aircraft is also disclosed. The thermal management system may include a sensor configured to detect a current altitude of the aircraft, and a controller in operative communication with the sensor. The controller may be configured to manage a fuel temperature for the gas turbine engine based at least in part on the current altitude detected by the sensor.

19 Claims, 4 Drawing Sheets

(51) Int. Cl.
*F02C 7/14* (2006.01)
*F02C 9/28* (2006.01)
*B64D 27/10* (2006.01)
*F02C 7/224* (2006.01)
*F02C 7/06* (2006.01)

(52) U.S. Cl.
CPC ............... *F02C 7/22* (2013.01); *F02C 7/224*
(2013.01); *F02C 9/28* (2013.01); *F05D*
*2220/323* (2013.01); *F05D 2260/213*
(2013.01); *F05D 2270/20* (2013.01); *F05D*
*2270/313* (2013.01); *Y02T 50/675* (2013.01)

(58) Field of Classification Search
CPC ............... F02C 7/224; F05D 2220/323; F05D
2270/20; F05D 2260/213; F05D
2270/313; Y02T 50/675
USPC ............................................................ 701/8
See application file for complete search history.

(56) References Cited

U.S. PATENT DOCUMENTS

2005/0279102 A1* 12/2005 O'Connor ............... F02C 7/275
60/778
2013/0202406 A1* 8/2013 Papa .......................... F02C 7/14
415/1

\* cited by examiner

TECHNIQUE FOR OPTIMIZING ENGINE PERFORMANCE USING FUEL TEMPERATURE

RELATED APPLICATIONS

This application is a National Phase Application of Patent Application PCT/US2014/059031 filed on Oct. 3, 2014, which claims the benefit of and priority to U.S. Provisional Patent Application No. 61/933,939 filed Jan. 31, 2014, the contents each of which are incorporated herein by reference in their entirety.

FIELD OF THE DISCLOSURE

The present disclosure is directed generally toward gas turbine engines, and more specifically toward thermal management systems and methods in gas turbine engines.

BACKGROUND OF THE DISCLOSURE

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

A thermal management system in the gas turbine engine may maintain operable temperatures for fuel, oil, and other fluids communicated throughout the engine. Typically, thermal management systems may include one or more heat exchangers for transferring heat between the various fluids. The thermal management system may manage heat generated by the engine during operation. For example, the thermal management system may communicate conditioned fluids to various systems in order to minimize heat generation and dissipate the heat. Heat may be transferred into the engine fuel in order to increase fuel efficiency and engine performance.

However, typical thermal management systems have not attempted to protect hardware in the fuel system. Fuel system hardware in gas turbine engines may experience contamination and lacquer build-up. For example, in aircraft applications, fuel lacquering or other deposit formation may be induced at low altitudes due to the high oxygen content of fuel and elevated fuel temperatures. Accordingly, there exists a need for a thermal management system and method that provides fuel efficiency, while protecting against deposit formation on the fuel hardware. This invention is directed to solving this need and others.

SUMMARY OF THE DISCLOSURE

According to one embodiment, a method of protecting fuel hardware for a gas turbine engine in an aircraft is disclosed. The method may comprise determining a current altitude of the aircraft, and controlling a temperature of fuel for the gas turbine engine based at least in part on the current altitude.

In a refinement, the method may further comprise scheduling the fuel temperature at a first predetermined temperature when the current altitude is below a threshold altitude.

In another refinement, the method may further comprise scheduling the fuel temperature at a second predetermined temperature when the current altitude is above the threshold altitude.

In another refinement, the method may further comprise elevating the fuel temperature of the gas turbine engine when the current altitude is above a threshold altitude.

In another refinement, the method may further comprise scheduling the fuel temperature of the gas turbine engine based at least in part on an elapsed time after takeoff of the aircraft.

In another refinement, the method may further comprise controlling the fuel temperature of the gas turbine engine based at least in part on an oil temperature limit.

According to another embodiment, a thermal management system for a gas turbine engine in an aircraft is disclosed. The thermal management system may comprise a sensor configured to detect a current altitude of the aircraft, and a controller in operative communication with the sensor. The controller may be configured to manage a fuel temperature for the gas turbine engine based at least in part on the current altitude detected by the sensor.

In a refinement, the controller may be further configured to schedule the fuel temperature at a first predetermined temperature when the current altitude is below a threshold altitude.

In another refinement, the first predetermined temperature may be between an inclusive range of about 200° F. to about 220° F.

In another refinement, the controller may be further configured to schedule the fuel temperature at a second predetermined temperature when the current altitude is above the threshold altitude.

In another refinement, the second predetermined temperature may be higher than the first predetermined temperature.

In another refinement, the second predetermined temperature may be between an inclusive range of about 250° F. to about 300° F.

In another refinement, the threshold altitude may be between an inclusive range of about 10,000 feet to about 30,000 feet, the threshold altitude preprogrammed into a memory associated with the controller.

In another refinement, the thermal management system of claim may further comprise an oil temperature sensor configured to detect an oil temperature of the gas turbine engine.

In another refinement, the controller may be further configured to manage the oil temperature based at least in part on an oil temperature limit of a heat exchanger.

In another refinement, the thermal management system of claim may further comprise a weight sensor configured to detect a weight on a plurality of wheels of the aircraft, and wherein the controller may be further configured to manage a fuel temperature of the gas turbine engine based at least in part on the weight detected by the weight sensor.

According to yet another embodiment, a non-transitory computer readable medium having stored thereon computer-executable instructions which when executed by a computer controls a thermal management system for a gas turbine engine in an aircraft is disclosed. The thereon computer-executable instructions may comprise instructions for receiving a signal indicative of a current altitude of the aircraft, comparing the current altitude to a threshold altitude preprogrammed into the non-transitory computer readable medium, and controlling a fuel temperature of the gas turbine engine based at least in part on the comparison of the current altitude to the threshold altitude.

In a refinement, the non-transitory computer readable storage medium may further comprise instructions for providing the fuel temperature between an inclusive range of about 200° F. to about 220° F. if the current altitude is below the threshold altitude.

In another refinement, the non-transitory computer readable storage medium may further comprise instructions for providing the fuel temperature between an inclusive range of about 250° F. to about 300° F. if the current altitude is above the threshold altitude.

In another refinement, the non-transitory computer readable storage medium may further comprise instructions for maintaining an oil temperature of the gas turbine engine according to a heat exchanger limit.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
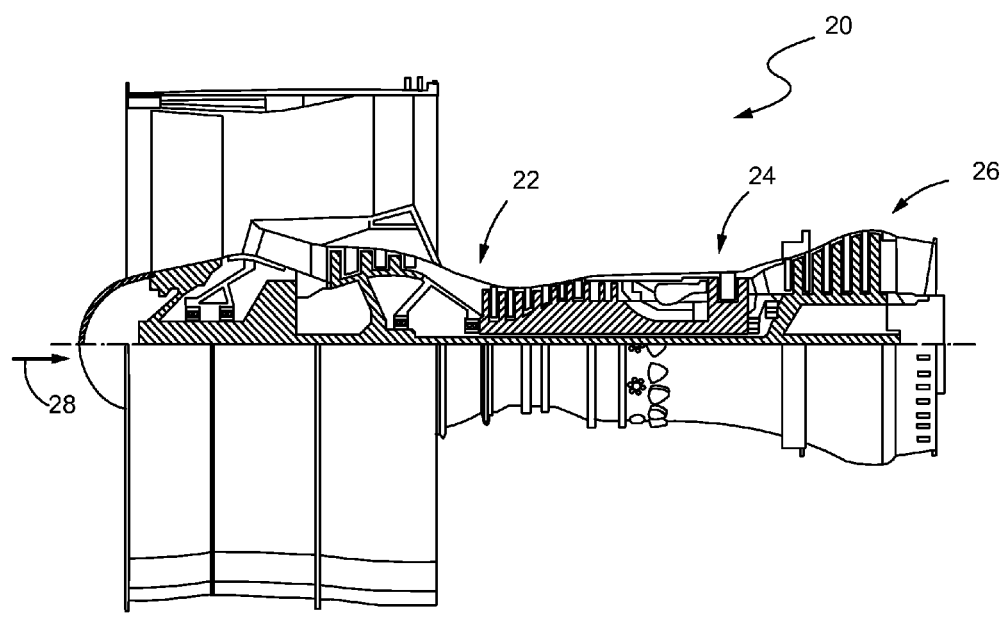
FIG. 1 is a side view of a gas turbine engine, partially in cross-section, according to one embodiment of the present disclosure.

Referring now to the drawings, and with specific reference to FIG. 1, in accordance with the teachings of the disclosure, an exemplary gas turbine engine 20 is shown. The gas turbine engine 20 may generally comprise a compressor section 22 where air is pressurized, a combustor 24 downstream of the compressor section which mixes and ignites the compressed air with fuel and thereby generates hot combustion gases, a turbine section 26 downstream of the combustor 24 for extracting power from the hot combustion gases, and an annular flow path 28 extending axially through each. The gas turbine engine 20 may be used on an aircraft for generating thrust or power, or in land-based operations for generating power as well.

During operation, the compressor section 22, combustor 24, and turbine section 26 generate heat, which may be carried by fluids communicated throughout the gas turbine engine 20. For example, fuel and oil for the gas turbine engine 20 may be circulated throughout the engine 20 and may carry a portion of the heat that is generated during operation. Other fluids than fuel and oil, such as, without limitation, lubricating fluids, hydraulic fluids and the like, may also be used.

Figure 2:
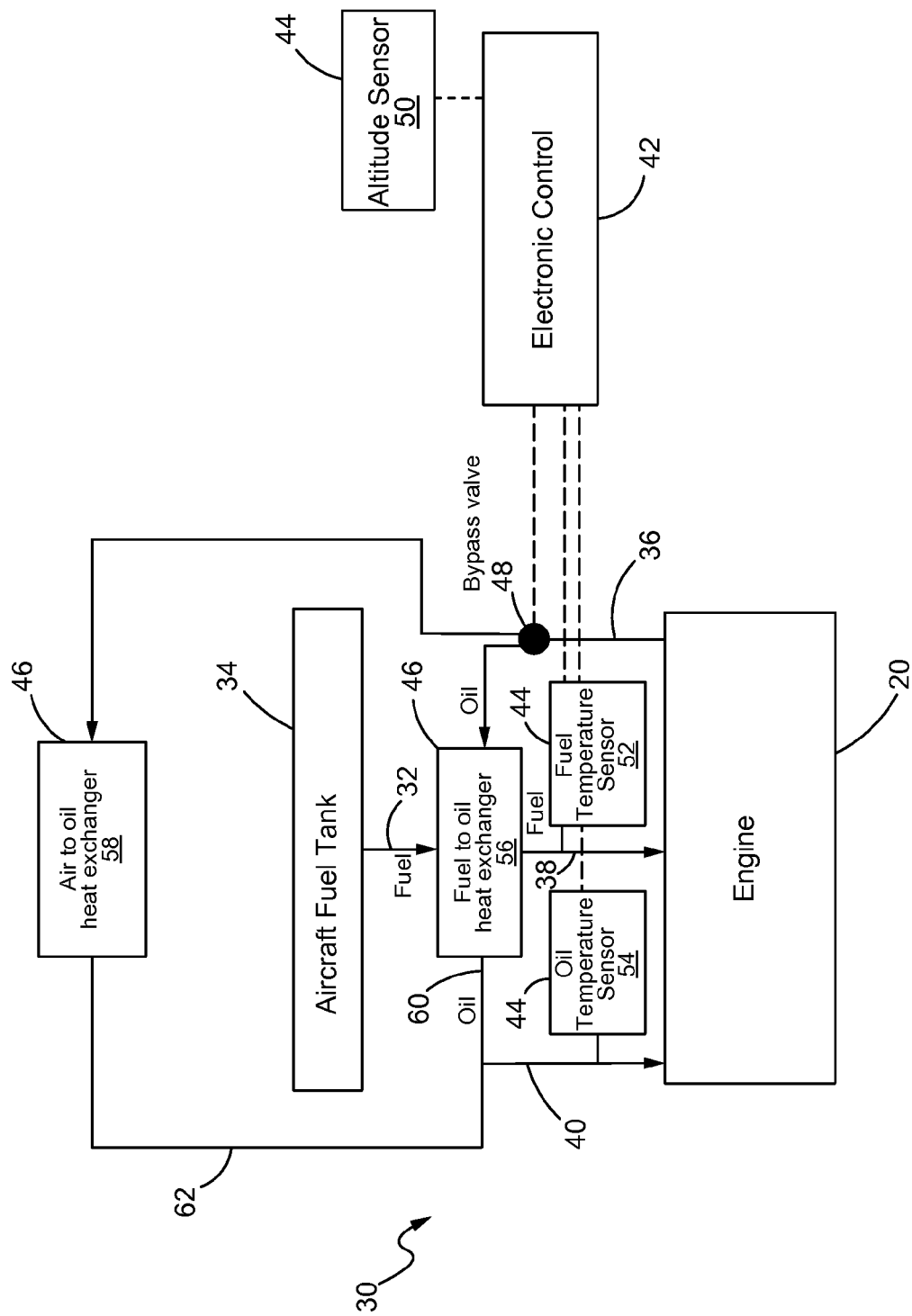
FIG. 2 is a schematic representation of a thermal management system of the gas turbine engine of FIG. 1, according to one embodiment of the present disclosure.

Referring now to FIG. 2, with continued reference to FIG. 1, a thermal management system 30 for the gas turbine engine 20 is shown, according to an embodiment of the present disclosure. The thermal management system 30 may manage the heat generated by the gas turbine engine 20 during operation. In order to minimize heat generation and dissipate the heat, the thermal management system 30 may communicate conditioned fluids to various systems of the gas turbine engine 20. Conditioned fluids may include, heated, cooled, and/or pressurized fluids. For example, heat may be transferred into the engine fuel in order to increase fuel efficiency and engine performance.

The thermal management system 30 may condition fuel 32 from an aircraft fuel tank 34 and oil 36 from the gas turbine engine 20 and deliver the conditioned fuel 38 and conditioned oil 40 to various systems in the engine 20. In operative communication with an electronic controller 42, the thermal management system 30 may include a plurality of sensors 44, at least one heat exchanger 46, and a bypass valve 48. The plurality of sensors 44 may comprise an altitude sensor 50, a fuel temperature sensor 52, and an oil temperature sensor 54. The altitude sensor 50 may be configured to detect a real-time, current altitude of the aircraft. The fuel temperature sensor 52 may be configured to detect a temperature of the conditioned fuel 38, such as, at an inlet of a fuel nozzle in the combustor 24. The oil temperature sensor 54 may be configured to detect a temperature of the conditioned oil 40 delivered to the gas turbine engine 20.

The at least one heat exchanger 46 may comprise a liquid to liquid heat exchanger configured to transfer heat between liquids. For example, the at least one heat exchanger 46 may comprise a fuel/oil cooler 56 and an air/oil cooler 58. The bypass valve 48 may split flow in variable amounts between the fuel/oil cooler 56 and the air/oil cooler 58 based on signals received from the controller 42.

The fuel/oil cooler 56 may be used to transfer heat from the oil 36 coming from the engine 20 to the fuel 32 coming from the fuel tank 34. In so doing, the conditioned fuel 38 exiting the fuel/oil cooler 56 and entering the combustor 24 may have an elevated temperature, which is desirable for fuel efficiency and engine performance. Oil 60 exiting the fuel/oil cooler 56 may have a decreased temperature and may be provided to gas turbine engine components that require cooling. The air/oil cooler 58 may be used to dissipate heat from the hot oil 36 into air in order to provide cooled oil 62. Cooled oil 62 and the oil 60 exiting the fuel/oil cooler 56 may be mixed together to provide the conditioned oil 40, which is delivered to hot components of the engine 20 in need of cooling.

The controller 42 may comprise a processor (e.g., "computer processor") or processor-based device that may include or be associated with a non-transitory computer readable storage medium having stored thereon computer-executable instructions. The controller 42 may include other hardware, software, firmware, and combinations thereof. For example, the controller 42 may comprise a Full Authority Digital Engine Control (FADEC) configured to control engine performance.

More specifically, the controller 42 may be connected to each of the plurality of sensors 44 and bypass valve 48. Based on data received from the plurality of sensors 44, the controller 42 may schedule and control a temperature of the conditioned fuel 38 using the bypass valve 48. Depending on a desired fuel temperature, the controller 42 may send signals to the bypass valve 48 in order to regulate a division of hot oil flow between the fuel/oil cooler 56 and the air/oil cooler 58.

In order to protect fuel hardware from lacquering and other deposit formation, the controller 42 may be configured to manage fuel temperature based on the current altitude detected by the altitude sensor 50. For example, the controller 42 may schedule a decreased temperature for the conditioned fuel 38 at lower altitudes (e.g., during ground, idle, takeoff, and low altitude climb). At higher altitudes (e.g., during cruise and high altitude climb), the controller 42 may schedule an elevated temperature for the conditioned fuel 38.

With a high oxygen content of fuel at low altitudes, the decreased fuel temperature protects against lacquering and other deposit formation on fuel hardware. As fuel deoxygenates at higher altitudes, the need for protection against deposit formation is lessened. Therefore, the elevated fuel temperature may be provided to the gas turbine engine 20 at higher altitudes, thereby providing for increased fuel efficiency and engine performance. The controller 42 may be configured to estimate when fuel is at low oxygen content in order to elevate temperatures.

For example, the controller 42 may be configured to schedule the temperature of the conditioned fuel 38 according to a first predetermined temperature when the current altitude detected by the altitude sensor 50 is below a threshold altitude. Furthermore, the controller 42 may be configured to schedule the temperature of the conditioned fuel 38 according to a second predetermined temperature when the current altitude detected by the altitude sensor 50 is above the threshold altitude.

The first predetermined temperature, the second predetermined temperature, and the threshold altitude may be preprogrammed into a memory associated with the controller 42. For example, the threshold altitude may be between an inclusive range of about 10,000 feet to about 30,000 feet. In one example, the threshold altitude may be 20,000 feet. It is to be understood that the threshold altitude may be values under 10,000 feet and over 30,000 feet, as well.

The second predetermined temperature may be higher than the first predetermined temperature. In one example, the first predetermined temperature may be between an inclusive range of about 200° F. to about 220° F., while the second predetermined temperature may be between an inclusive range of about 250° F. to about 300° F. For instance, the second predetermined temperature may be 275° F. Depending on the fuel temperature detected by the fuel temperature sensor 52, the controller 42 may send signals to the bypass valve 48 for heating or cooling of the fuel 42 coming from the fuel tank 34 in order to achieve the first and/or second predetermined temperatures.

It is to be understood that the first predetermined temperature may also be higher than the second predetermined temperature. In addition, other temperatures than those stated above for the first and second predetermined temperatures are certainly possible. Although only one threshold altitude and two predetermined temperatures are discussed above, it is to be understood that more or less threshold altitudes and predetermined temperatures may be incorporated into the controller 42.

In addition, the thermal management system 30 may be configured to manage oil temperature. In order to ensure the at least one heat exchanger 46 (e.g., air/oil cooler 58) does not exceed thermal capacity, the controller 42 may be configured to maintain the temperature of the conditioned oil 40 under oil temperature limits of the at least one heat exchanger 46. For example, the oil temperature limit may be 300° F. or anywhere between 250° F. and 325° F., although other oil temperature limits are certainly possible.

Based on the oil temperature detected by the oil temperature sensor 54, the controller 42 may accordingly adjust the scheduled fuel temperatures. For example, during low altitudes when the decreased fuel temperature is delivered to the gas turbine engine 20, the temperature of the conditioned oil 40 may be increased. To ensure the air/oil cooler 58 does not exceed thermal capacity, the controller 42 may maintain the fuel temperature such that the oil temperature does not surpass the oil temperature limits of the air/oil cooler 58.

Figure 3:
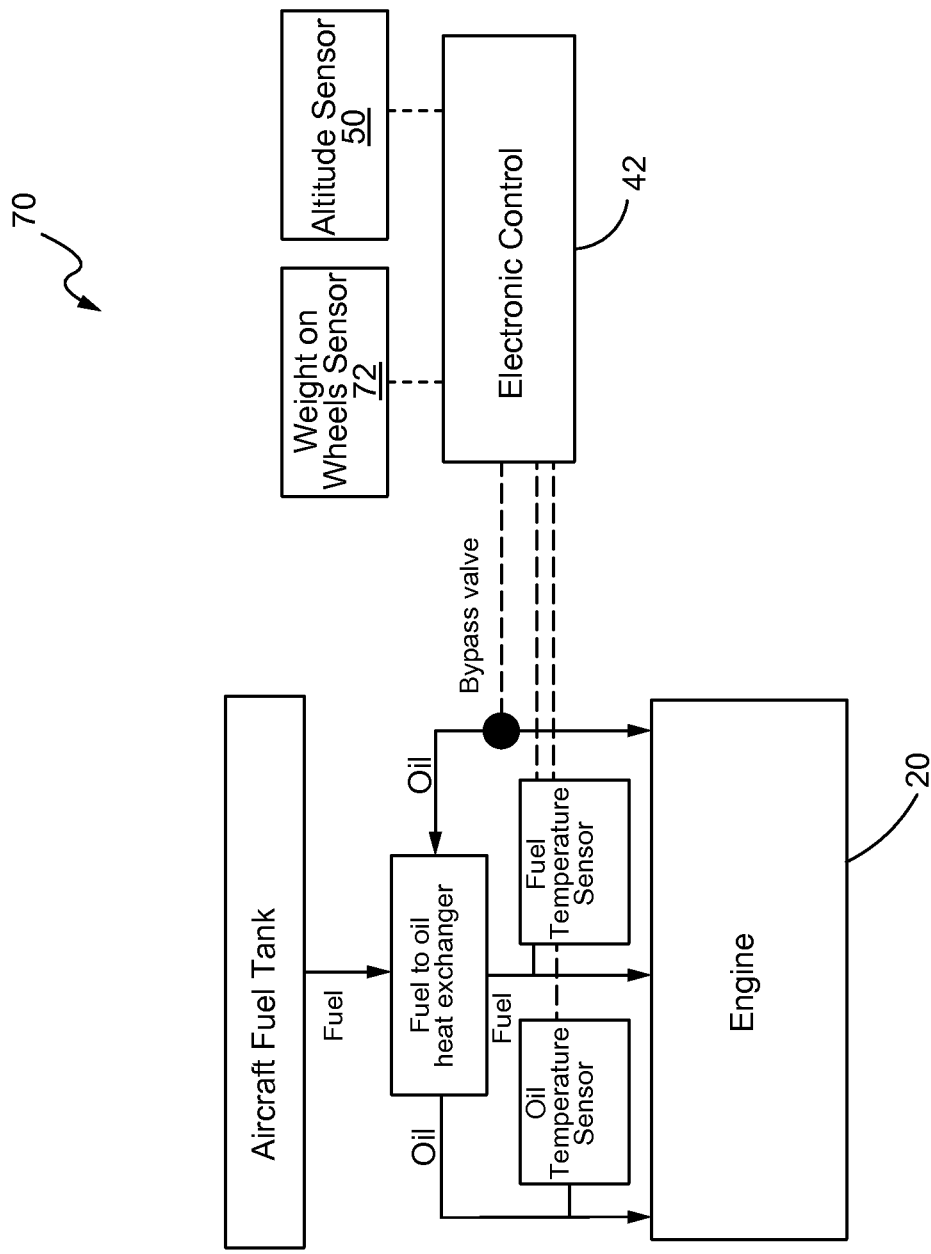
FIG. 3 is a schematic representation of a thermal management system of the gas turbine engine of FIG. 1, according to another embodiment of the present disclosure.

Referring now to FIG. 3, with continued reference to FIGS. 1 and 2, a thermal management system 70 for the gas turbine engine 20 is shown, according to another embodiment of the present disclosure. The thermal management system 70 may additionally comprise a weight on wheels sensor 72 configured to detect a weight on a plurality of wheels of the aircraft. The controller 42 may be configured to manage fuel temperature based on the weight detected by the weight on wheels sensor 72.

For example, if a weight is detected by the sensor 72, this indicates the aircraft is on the ground at a low altitude. Therefore, the controller 42 may schedule a decreased fuel temperature. If no weight is detected by the sensor 72, this indicates the aircraft is in the air. Therefore, the controller 42 may schedule an elevated fuel temperature. Data from the weight on wheels sensor 72 may be used in conjunction with data from the altitude sensor 50 in order to manage fuel temperatures.

An elapsed time after takeoff of the aircraft may also be used to manage the fuel temperature. For example, a predetermined time may be preprogrammed into a memory associated with the controller 42 for scheduling a change in fuel temperature. The predetermined time may be an estimated time after takeoff when the aircraft may be above the threshold altitude. Therefore, the controller 42 may be configured to schedule a decreased fuel temperature before takeoff and after takeoff before the predetermined time has elapsed. Once the predetermined time has elapsed after takeoff, then the controller 42 may be configured to schedule an elevated fuel temperature.

Figure 4:
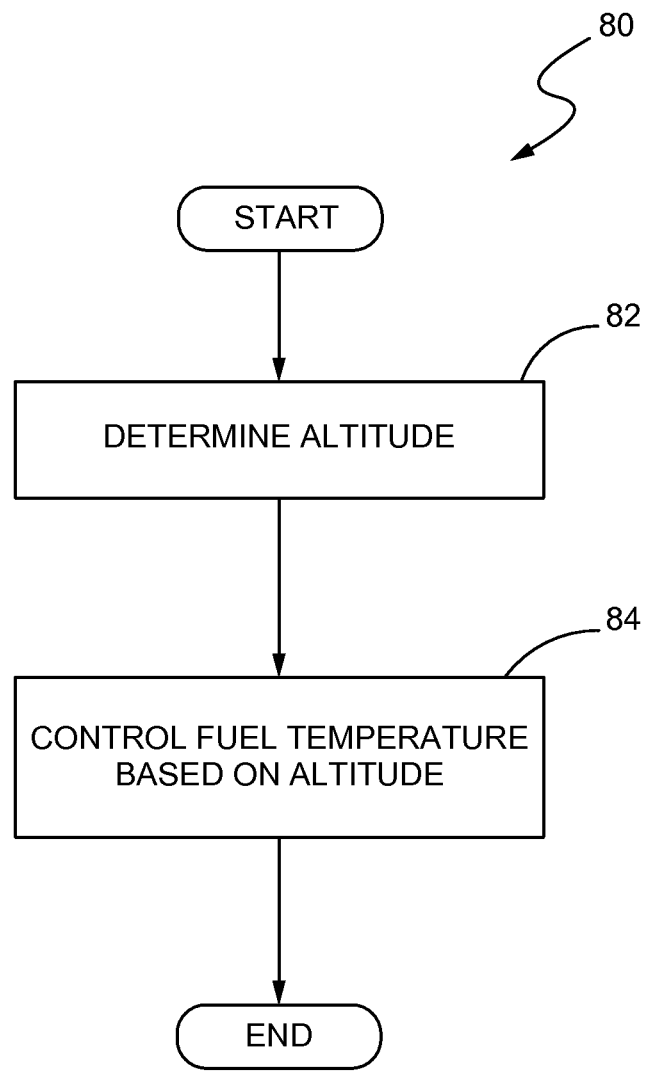
FIG. 4 is flowchart outlining a process for protecting fuel hardware of a gas turbine engine, according to an embodiment of the present disclosure.

Turning now to FIG. 4, with continued reference to FIGS. 1-3, a process 80 for protecting fuel hardware for the gas turbine engine 20 in the aircraft is shown, according to yet another embodiment of the present disclosure. At block 82, the current altitude of the aircraft may be determined. At block 84, the fuel temperature for the gas turbine engine may be controlled based at least in part on the current altitude determined from block 82.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The described disclosure provides a thermal management system and technique for optimizing engine performance using fuel temperature. By providing a decreased fuel temperature at lower altitudes when the oxygen content of fuel is high, the fuel hardware (e.g., fuel-draulic system, actuators, hydraulic pistons, etc.) is protected from fuel lacquering and other deposit formation. At higher altitudes when the oxygen content of fuel is low due to natural deoxygenation, an elevated fuel temperature is scheduled, thereby increasing fuel efficiency and engine performance. In addition, the disclosed system and method maintain the oil temperature such that it does not exceed heat exchanger limits. By varying fuel temperature throughout the flight of the aircraft, the described disclosure optimizes important aspects of fuel temperature control.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. A method of protecting fuel hardware with a thermal management system for a gas turbine engine in an aircraft, comprising:
   determining a current altitude of the aircraft;
   controlling a temperature of fuel for the gas turbine engine based at least in part on the current altitude, and
   elevating the fuel temperature of the gas turbine engine when the current altitude is above a threshold altitude.

2. The method of claim 1, further comprising scheduling the fuel temperature at a first predetermined temperature when the current altitude is below a threshold altitude.

3. The method of claim 2, further comprising scheduling the fuel temperature at a second predetermined temperature when the current altitude is above the threshold altitude.

4. The method of claim 1, further comprising scheduling the fuel temperature of the gas turbine engine based at least in part on an elapsed time after takeoff of the aircraft.

5. The method of claim 1, further comprising controlling the fuel temperature of the gas turbine engine based at least in part on an oil temperature limit.

6. A thermal management system for a gas turbine engine in an aircraft, comprising:
   a sensor configured to detect a current altitude of the aircraft; and
   a controller in operative communication with the sensor, the controller configured to manage a fuel temperature for the gas turbine engine based at least in part on the current altitude detected by the sensor, the managing including elevating the fuel temperature of the gas turbine engine when the current altitude is above a threshold altitude.

7. The thermal management system of claim 6, wherein the controller is further configured to schedule the fuel temperature at a first predetermined temperature when the current altitude is below a threshold altitude.

8. The thermal management system of claim 7, wherein the first predetermined temperature is between an inclusive range of about 200° F. to about 220° F.

9. The thermal management system of claim 7, wherein the controller is further configured to schedule the fuel temperature at a second predetermined temperature when the current altitude is above the threshold altitude.

10. The thermal management system of claim 9, wherein the second predetermined temperature is higher than the first predetermined temperature.

11. The thermal management system of claim 9, wherein the second predetermined temperature is between an inclusive range of about 250° F. to about 300° F.

12. The thermal management system of claim 9, wherein the threshold altitude is between an inclusive range of about 10,000 feet to about 30,000 feet, the threshold altitude preprogrammed into a memory associated with the controller.

13. The thermal management system of claim 6, further comprising an oil temperature sensor configured to detect an oil temperature of the gas turbine engine.

14. The thermal management system of claim 13, wherein the controller is further configured to manage the oil temperature based at least in part on an oil temperature limit of a heat exchanger.

15. The thermal management system of claim 6, further comprising a weight sensor configured to detect a weight on a plurality of wheels of the aircraft, and wherein the controller is further configured to manage a fuel temperature of the gas turbine engine based at least in part on the weight detected by the weight sensor.

16. A non-transitory computer readable medium having stored thereon computer-executable instructions which when executed by a computer controls a thermal management system for a gas turbine engine in an aircraft, the thereon computer-executable instructions comprising instructions for:
   receiving a signal indicative of a current altitude of the aircraft;
   comparing the current altitude to a threshold altitude preprogrammed into the non-transitory computer readable medium; and
   controlling a fuel temperature of the gas turbine engine based at least in part on the comparison of the current altitude to the threshold altitude, the controlling including elevating the fuel temperature of the gas turbine engine when the current altitude is above a threshold altitude.

17. The non-transitory computer readable storage medium of claim 16, further comprising instructions for providing the fuel temperature between an inclusive range of about 200° F. to about 220° F. if the current altitude is below the threshold altitude.

18. The non-transitory computer readable storage medium of claim 16, further comprising instructions for providing the fuel temperature between an inclusive range of about 250° F. to about 300° F. if the current altitude is above the threshold altitude.

19. The non-transitory computer readable storage medium of claim 17, further comprising instructions for maintaining an oil temperature of the gas turbine engine according to a heat exchanger limit.

* * * * *